US005573697A

United States Patent [19]

Riddick et al.

[11] Patent Number: 5,573,697

[45] Date of Patent: Nov. 12, 1996

[54] PROCESS FOR MAKING HIGH ACTIVE, HIGH DENSITY DETERGENT GRANULES

[76] Inventors: Eric F. Riddick; Judith A. Lakes, both of The Procter & Gamble Company, Ivorydale Technical Center, 5299 Spring Grove Ave., Cincinnati, Ohio 45217

[21] Appl. No.: 455,781

[22] Filed: May 31, 1995

[51] Int. Cl.$^6$ .......................... C11D 11/04; C11D 17/06; B29C 67/00

[52] U.S. Cl. .......................... 510/359; 264/117; 264/140; 510/452; 510/495

[58] Field of Search .................................. 252/89.1, 174, 252/174.14, 135, 530, 534, 539, 549, 553, 558; 264/117, 140

[56] References Cited

U.S. PATENT DOCUMENTS

| | | | |
|---|---|---|---|
| 3,434,974 | 3/1969 | Austin et al. | 252/138 |
| 3,597,361 | 8/1971 | Summer | 252/161 |
| 4,515,707 | 5/1985 | Brooks | 252/368 |
| 4,587,029 | 5/1986 | Brooks | 252/91 |
| 4,690,785 | 9/1987 | Mausner et al. | 260/505 |
| 4,734,224 | 3/1988 | Barrett et al. | 252/558 |
| 5,133,924 | 7/1992 | Appel et al. | 264/342 |
| 5,164,108 | 11/1992 | Appel et al. | 252/174 |

FOREIGN PATENT DOCUMENTS

| | | | |
|---|---|---|---|
| 0438320A2 | 7/1991 | European Pat. Off. | C11D 17/06 |
| 0352135B1 | 9/1994 | European Pat. Off. | C11D 11/00 |
| 9001536 | 2/1990 | WIPO . | |

*Primary Examiner*—Paul Lieberman
*Assistant Examiner*—Lorna M. Douyon
*Attorney, Agent, or Firm*—Milton B. Graff; Donald E. Hasse; Jacobus C. Rasser

[57] ABSTRACT

A continuous process for producing high active, high density detergent granules consists essentially of the following steps:

(a) preparing a mixture in a high-speed mixer, the mixture being prepared from components fed to the mixer consisting essentially of the following:

(1) from about 15% to about 35% anionic surfactant acid selected from alkylbenzene sulfonic acid and alkyl sulfuric acid and mixtures thereof;

(2) from about 5% to about 65% phosphate builder selected from polyphosphates and pyrophosphates and mixtures thereof; and (3) from about 10% to about 65% particulate carbonate selected from sodium carbonate and potassium carbonate and mixtures thereof, the amount of carbonate being at least about 2 times the amount theoretically needed to neutralize the anionic surfactant acid;

(b) agglomerating the mixture from step (a) in a moderate-speed mixer; whereby the anionic surfactant acid is neutralized by the carbonate, and the resulting detergent granules have a bulk density of greater than about 550 g/l and a water content of less than about 7%.

16 Claims, No Drawings

PROCESS FOR MAKING HIGH ACTIVE, HIGH DENSITY DETERGENT GRANULES

TECHNICAL FIELD

The subject invention involves a process for making high active, high density detergent granules containing phosphate, which are then typically combined with other ingredients to form a detergent product.

BACKGROUND OF THE INVENTION

Detergent granules containing anionic surfactant are typically produced by neutralizing the acid form of the surfactant in the presence of a detergent builder. Low density granules are commonly produced by making an aqueous paste of the neutralized surfactant and builder, and spray drying the paste to form granules. Higher density detergent granules have been made by carrying out the surfactant neutralization and incorporation of builder in a mixer. Typically, water, added alone or with another raw material, and/or a flow aid are used to obtain complete neutralization and desired granule formation in such a mixing process. The granules must then be dried to remove excess water.

It is an object of the subject invention to provide a process for making high active, high density detergent granules containing anionic surfactant and phosphate builder.

It is a further object of the subject invention to provide such process with minimal incorporation of water, such that drying of the detergent granules produced is unnecessary.

It is a still further object of the subject invention to provide such process where incorporation of a flow aid in the process is unnecessary.

It is also an object of the subject invention to provide such process which produces small granules.

SUMMARY OF THE INVENTION

The subject invention involves a continuous process for producing high active, high density detergent granules consisting essentially of the following steps:

(a) Preparing a mixture in a high-speed mixer, the mixture being prepared from components fed to the mixer consisting essentially of the following:

(1) from about 15% to about 35% anionic surfactant acid selected from alkylbenzene sulfonic acid and alkyl sulfuric acid and mixtures thereof;

(2) from about 5% to about 65% phosphate builder selected from polyphosphates and pyrophosphates and mixtures thereof; and (3) from about 10% to about 65% particulate carbonate selected from sodium carbonate and potassium carbonate and mixtures thereof, the amount of carbonate being at least about 2 times the amount theoretically needed to neutralize the anionic surfactant acid;

(b) agglomerating the mixture from step (a) in a moderate-speed mixer; whereby the anionic surfactant acid is neutralized by the carbonate, and the resulting detergent granules have a bulk density of greater than about 550 g/l and a water content of less than about 7%.

DETAILED DESCRIPTION OF THE INVENTION

The subject invention involves a two-step mixing process for producing high active, high density detergent granules by dry neutralizing the acid form of an anionic detergent with a particulate inorganic carbonate compound in the presence of a phosphate builder. Typically, such detergent granules are then blended with other ingredients to produce a granular detergent product, especially suitable for cleaning clothes.

The subject invention process produces a mixture from raw materials, the raw materials consisting essentially of, preferably consisting of, anionic surfactant acid, phosphate builder, and alkali metal carbonate raw material sources.

Raw Materials

The subject invention process involves neutralization of an anionic surfactant acid. The anionic surfactant acid raw materials useful in the subject invention process consist essentially of alkylbenzene sulfonic acid or alkyl sulfuric acid or a mixture thereof. The anionic surfactant acid raw materials preferably have a moisture content of less than about 0.3%, more preferably less than about 0.1%. Based on the total weight of raw materials added during the process of the subject invention, the amount of anionic surfactant acid is from about 15% to about 35%, preferably from about 20% to about 30%, more preferably from about 25% to about 28%.

Preferred alkylbenzene sulfonic acid useful in the subject process includes that with an alkyl portion which is straight chain or branched chain, preferably having from about 8 to about 18 carbon atoms, more preferably from about 10 to about 16 carbon atoms. The alkyl chains of the alkylbenzene sulfonic acid preferably have an average chain length of from about 11 to about 14 carbon atoms. Alkylbenzene sulfonic acid which includes branched chain alkyl is termed HABS (ABS when neutralized). Alkylbenzene sulfonic acid which is all straight chain is preferred because it is more easily biodegraded; it is termed HLAS (LAS when neutralized).

Preferred alkyl sulfuric acid useful in the subject process includes that with an alkyl portion which is straight chain or branched chain, preferably having from about 8 to about 24 carbon atoms, more preferably from about 10 to about 20 carbon atoms, more preferably still from about 12 to about 18 carbon atoms. The alkyl chains of the alkyl sulfuric acids preferably have an average chain length of from about 14 to about 16 carbon atoms. The alkyl chains are preferably linear. Alkyl sulfuric acids (HAS; AS when neutralized) are typically obtained by sulfating fatty alcohols produced by reducing the glycerides of fats and/or oils from natural sources, especially from tallow or coconut oil.

The anionic surfactant acids useful in the subject invention process may also be combinations of alkylbenzene sulfonic acid and alkyl sulfuric acid, whether mixed together or added during the process separately. Combinations having a ratio of alkylbenzene sulfonic acid to alkyl sulfuric acid of from about 20:80 to about 80:20 are preferred; those having a ratio of from about 40:60 to about 60:40 are more preferred.

The phosphate builders raw materials useful in the subject invention process are in particulate form and consist essentially of the water-soluble salts of polyphosphates or pyrophosphates or mixtures thereof. The phosphate builder raw materials preferably have a moisture content of less than about 2%, more preferably less than about 1%. Based on the total weight of raw materials added during the process of the subject invention, the amount of phosphate builder is from about 5% to about 65%, preferably from about 15% to about 55%, more preferably from about 25% to about 45%. Phosphate builder raw materials are preferably obtained in powder form having a median particle size of from about 10 microns to about 50 microns, more preferably from about 20 microns to about 30 microns. If coarser raw materials are obtained, a conventional pregrinding step can be used to obtain a desired particle size distribution.

A preferred builder useful in the subject process is sodium tripolyphosphate (STPP); STPP can be obtained commercially from, for example, FMC Corp. Another preferred phosphate builder is tetrasodium pyrophosphate (TSPP); TSPP can be obtained commercially from, for example, FMC Corp.

The subject invention process utilizes particulate alkali metal carbonate raw materials, preferably consisting essentially of sodium carbonate or potassium carbonate or a mixture thereof, for neutralization of the anionic surfactant acids. Alkali metal carbonate is preferably fed to the subject process as powder having a median particle size of from about I microns to about 40 microns, more preferably from about 5 microns to about 15 microns. If coarser raw material is obtained, a conventional pregrinding step can be used to obtain a desired particle size distribution. The alkali metal carbonate raw materials preferably have a moisture content of less than about 2%, more preferably less than about 1%. Based on the total weight of raw materials added to the process of the subject invention, the amount of alkali metal carbonate is from about 10% to about 65%, preferably from about 20% to about 55%, more preferably from about 30% to about 45%.

To neutralize the anionic surfactant acid, each carbonate ion ($CO_3^{=}$) reacts with two acidic hydrogens ($H^+$). From this reaction, the amount of carbonate raw material needed to theoretically neutralize all the acid raw material can be determined. The amount of carbonate fed to the subject process is at least about 2 times that theoretically needed to neutralize the acid, preferably from about 4 times to about 20 times, more preferably from about 5 times to about 15 times, more preferably still from about 6 times to about 12 times.

In the subject invention process, substantially the only water present in the materials as they go through the process is the minor amounts of moisture present in the raw materials and the water generated by the neutralization reaction. Throughout the process, the maximum amount of water in the materials being processed is preferably about 8%, more preferably about 6%, more preferably still about 5%, still more preferably about 3%. The water loss (which is due to evaporation) during the subject process, based on the weight of the granules produced, is less than about 2%, preferably from about 0.5% to about 1.5%. The amount of moisture in the detergent granules produced by the subject process is from 0% to about 7%, preferably from about 0.5% to about 5%, more preferably from about 1% to about 3%. The detergent granules thus produced may be somewhat hygroscopic and pick up moisture from the atmosphere.

The detergent granules made by the process of the subject invention preferably have a bulk density of greater than about 550 g/l, more preferably from about 600 g/l to about 900 g/l, more preferably still from about 650 g/l to about 850 g/l, still more preferably from about 700 g/l to about 800 g/l. The detergent granules from the process of the subject invention preferably have an average particle size of from about 200 microns to about 600 microns, more preferably from about 300 microns to about 500 microns, more preferably still from about 350 microns to about 450 microns.

In the subject invention processes, the materials being processed and the detergent granules produced are maintained substantially free of flow aids such as silicas, clays, diatomaceous earth, aluminosilicates, perlite, and calcite.

Process Steps

The subject invention continuous process comprises two mixing steps; the process preferably consists essentially of the two steps, more preferably consists of the two steps.

The first step of the process of the subject invention is carried out in a high-speed, high-shear mixer. Suitable mixers for this step include, for example, the Loedige CB®, the Shugi Granulator®, and the Drais K-TTP®. The preferred mixer for the first step of the subject invention process is the Loedige CB®. Typically, the high-speed mixer has a substantially cylindrical mixing chamber which is from about 0.3 m to about 1 m in diameter and from about 1 m to about 3.5 m in length. For mixers used in the first step of the subject invention process, the preferred mixers have a central shaft, with mixer blades attached, which preferably rotates at a speed of from about 300 rpm to about 1800 rpm, more preferably from about 350 rpm to about 1250 rpm, more preferably still from about 400 rpm to about 600 rpm, the speed generally being lower for larger mixers. The high-speed mixer preferably is water-jacketed to permit cooling water to flow through the mixer jacket, in order to remove heat generated by the neutralization reaction.

For the first step of the subject process, the above three raw materials are typically fed to the high-speed mixer near one end of the cylindrical chamber and intimately mixed as they proceed through the chamber; the mixture is discharged near the other end of the cylindrical chamber. The typical average throughput rate is from about 0.2 kg/sec to about 17 kg/sec, especially from about 9 kg/sec to about 13 kg/sec, the higher throughput rates generally being achieved using larger mixers. The average residence time of materials in the first-step mixer is preferably from about 2 seconds to about 30 seconds, more preferably from about 5 seconds to about 20 seconds, more preferably still from about 10 seconds to about 15 seconds.

Cooling water at a temperature of from about 5° C. to about 25° C. is preferably fed to the water jacket of the high-speed mixer. The temperature of the mixture at the discharge from the high-speed mixer is typically from about 35° C. to about 70° C., preferably from about 45° C. to about 55° C.

Much of the neutralization of the anionic surfactant acid by the carbonate occurs in the first step of the subject invention process. Preferably, substantially all of the neutralization takes place in the first step. The neutralization reaction may be completed after the mixture discharges from the first-step mixer. The anionic surfactant acid is substantially completely neutralized during the subject invention process.

The materials discharged from the first-step mixer are typically fed substantially immediately into the second-step mixer. The average residence time for materials between the mixers is preferably less than about 5 minutes, more preferably less than about 1 minute.

The second step of the process of the subject invention is carried out in a moderate-speed mixer. Suitable mixers for this step include plowshare mixers, for example, the Loedige KM® and the Drais K-T®. The Loedige KM® is the preferred mixer for the second step of the subject invention process. Typically, the moderate-speed mixer has a substantially cylindrical mixing chamber which is from about 0.6 m to about 2 m in diameter and from about 2 m to about 5 m in length. The preferred mixers have a central shaft, with mixer blades attached, which preferably rotates at a speed of from about 40 rpm to about 160 rpm, more preferably from about 45 rpm to about 140 rpm, more preferably still from about 50 rpm to about 80 rpm, the speed generally being lower for larger mixers. The moderate-speed mixer preferably is water-jacketed to permit warm water to flow through the mixer jacket, in order to maintain the temperature of product in the moderate-speed mixer at about its incoming temperature.

For the second step of the subject process, the mixture of materials discharged from the first-step mixer is typically fed to the moderate-speed mixer near one end of the cylindrical chamber, mixed as it proceeds through the chamber, and discharged near the other end of the cylindrical chamber. Typically, the throughput rate for the second step is the same as for the first step. The average residence time of the materials in the second-step mixer is preferably from about 20 seconds to about 300 seconds, more preferably from about 30 seconds to about 90 seconds, more preferably still from about 40 seconds to about 55 seconds.

Water at a temperature of from about 25° C. to about 50° C. is preferably fed to the water jacket of the moderate-speed mixer. The temperature of the mixture at the discharge of the moderate-speed mixer is typically from about 35° C. to about 70° C., preferably from about 45° C. to about 55° C.

EXAMPLES

The following non-limiting examples exemplify the processes of the subject invention.

Examples 1–8

Examples 1–7 are carried out using a water-jacketed Loedige CB-30® as the high-speed mixer and a water-jacketed Loedige KM-600® mixer as the moderate-speed mixer. Product passes immediately from the high-speed mixer into the moderate-speed mixer. Table 1 shows the production rate for each of Examples 1–8, and indicates the mixer speed and water-jacket temperature for each mixer. Table 1 also shows the amount of carbonate fed to the mixer in terms of the multiple of that amount needed to neutralize all of the anionic surfactant acids fed to the process for each Example.

TABLE 1

| Process Variable | Example 1 | 2 | 3 | 4 | 5 | 6 | 7 | 8 |
|---|---|---|---|---|---|---|---|---|
| Production Rate (kg/sec) | 0.38 | 0.38 | 0.25 | 0.38 | 0.25 | 0.25 | 0.38 | 0.38 |
| CB-30 | | | | | | | | |
| Mixer speed (rpm) | 1000 | 1200 | 1780 | 1200 | 1780 | 1780 | 1650 | 1650 |
| Jacket temp. (°C.) | 5 | 5 | 10 | 5 | 10 | 10 | 5 | 5 |
| KM-600 | | | | | | | | |
| Mixer speed (rpm) | 100 | 140 | 140 | 140 | 140 | 140 | 140 | 140 |
| Jacket temp (°C.) | 50 | 50 | 50 | 50 | 50 | 50 | 50 | 50 |
| Amount of carbonate (times that needed to neutralize acids) | 10.86 | 7.02 | 5.50 | 6.33 | 10.39 | 12.63 | 11.86 | 11.35 |

In each of Examples 1–7, three raw materials are fed continuously to the high-speed mixer: anionic surfactant acid raw material, phosphate builder raw material, and particulate carbonate raw material. The amount of each raw material fed in each of Examples 1–7 is the amount needed to produce the products shown in Table 2 below. The HLAS raw material, obtained from Pilot Chemical Co. under the trade name Calsoft LAS-99®, has an average of about 12 carbons in the alkyl chain and has a minimum purity of 96%. The HABS raw material, obtained from Pilot Chemical Co. under the trade name Emulsifier 99®, has an average of about 12 carbons in the alkyl chain and has a minimum purity of 96%. The alkyl sulfuric acid raw material is derived from coconut oil, has an average of about 13–14 carbon atoms in the alkyl chain, and has a minimum purity of 96%. STPP and TSPP raw materials are obtained from FMC Corp., and have a minimum purity of 94%, the impurities being primarily other phosphates. Sodium carbonate raw material, obtained from FMC Corp., has a minimum purity of 98%.

TABLE 2

| Product Component | Example 1 | 2 | 3 | 4 | 5 | 6 | 7 | 8 |
|---|---|---|---|---|---|---|---|---|
| LAS (%) | 35.0 | 25.4 | 20.0 | — | 23.0 | — | — | — |
| ABS (%) | — | — | — | 27.0 | — | 24.5 | 7.0 | — |
| AS (%) | — | — | — | — | — | — | 10.5 | 17.5 |
| STPP (%) | 5.4 | 47.1 | 63.3 | 47.0 | 39.3 | — | 46.2 | 46.2 |
| TSPP (%) | — | — | — | — | — | 26.3 | — | — |
| Sodium carbonate (%) | 56.3 | 24.9 | 14.7 | 23.5 | 35.3 | 46.5 | 33.8 | 33.8 |
| Water (%) | 2.4 | 1.9 | 1.5 | 1.8 | 1.8 | 2.1 | 1.9 | 1.9 |
| Sodium sulfate (%) | 0.6 | 0.4 | 0.3 | 0.4 | 0.4 | 0.4 | 0.4 | 0.4 |
| Other materials (%) | 0.3 | 0.3 | 0.2 | 0.3 | 0.2 | 0.2 | 0.2 | 0.2 |

The water in the products of Examples 1–8 is produced in the neutralization reaction or comes with the raw materials. The sodium sulfate is a byproduct of the neutralization reaction, due to the presence of a small amount of sulfuric acid impurity in the anionic surfactant acid. The other materials are impurities which come in with the raw materials.

Example 9

Example 8 is similar to the processes of Examples 1–8, except that the mixers used are larger: a water-jacketed Loedige CB-100® for the high-speed mixer and a water-jacketed Loedige KM-15,000® for the moderate-speed mixer. Product is produced at a rate of 8.3 kg/sec, The high-speed mixer operates at a speed of 450 rpm with 5° C.

water fed to the water-jacket. The moderate-speed mixer operates at 60 rpm with 25° C. water fed to the water-jacket. The amount of sodium carbonate fed to the process is 10.3 times the amount needed to neutralize the anionic surfactant acid. The product made in Example 9 is shown in Table 3 below.

TABLE 3

| Product Component | Example 9 |
|---|---|
| LAS (%) | 30.0 |
| STPP (%) | 21.6 |
| Sodium carbonate (%) | 45.5 |
| Water (%) | 2.1 |
| Sodium sulfate (%) | 0.5 |
| Other material (%) | 0.3 |

The raw material and product component sources are the same as for Examples 1–8.

While particular embodiments of the subject invention have been described, it would be obvious to those skilled in the art that various changes and modifications to the subject invention can be made without departing from the spirit and scope of the invention. It is intended to cover, in the appended claims, all such modifications that are within the scope of this invention.

What is claimed is:

1. A continuous process for producing high active, high density detergent granules consisting essentially of the following steps:

(a) preparing a mixture in a high-speed mixer having a shaft that rotates at a speed of from about 300 rpm to about 1800 rpm, the mixture being prepared from components fed to the mixer consisting essentially of the following:

(1) from about 15% to about 35% by weight anionic surfactant acid, having a moisture content of less than about 0.3% by weight, selected from the group consisting of alkylbenzene sulfonic acid, alkyl sulfuric acid, and mixtures thereof;

(2) from about 5% to about 65% by weight phosphate builder, having a moisture content of less than about 2% by weight, selected from the group consisting of polyphosphate, pyrophosphate and mixtures thereof; and (3) from about 10% to about 65% by weight particulate carbonate, having a moisture content of less than about 2% by weight, selected from the group consisting of sodium carbonate, potassium carbonate, and mixtures thereof, the amount of carbonate being at least about 2 times that amount theoretically needed to neutralize the anionic surfactant acid;

wherein the average residence time of the mixture in the high-speed mixer is from about 2 seconds to about 30 seconds;

(b) agglomerating the mixture from step (a) in a moderate-speed mixer having a shaft that rotates at a speed of from about 40 rpm to about 160 rpm, wherein the average residence time of the mixture in the moderate-speed mixer is from about 20 seconds to about 300 seconds;

whereby the acid is neutralized by the carbonate, and the resulting detergent granules have a bulk density of greater than about 550 g/l and a water content of less than about 5% by weight.

2. The process of claim 1 wherein the average particle size of the detergent granules produced by the process is from about 200 microns to about 600 microns.

3. The process of claim 2 wherein the amount of carbonate fed to the mixer is at least about 4 times the amount theoretically needed to neutralize the anionic surfactant acid.

4. The process of claim 3 wherein the alkyl portion of the alkylbenzene sulfonic acid is straight chain or branched chain having from about 8 to about 18 carbon atoms, and the alkyl portion of the alkyl sulfuric acid is straight chain or branched chain having from about 8 to about 24 carbon atoms.

5. The process of claim 4 wherein the bulk density of the granules produced in the process is from about 650 g/l to about 850 g/l, and wherein the average particle size of the detergent granules produced by the process is from about 300 microns to about 500 microns.

6. The process of claim 5 wherein the average residence time of the mixture in the high-speed mixer is from about 5 seconds to about 15 seconds, and the average residence time of the the mixture in the moderate-speed mixer is from about 30 seconds to about 55 seconds.

7. The process of claim 4 wherein the amount of anionic surfactant acid fed to the process is from about 20% to about 30% by weight.

8. The process of claim 7 wherein the amount of anionic surfactant acid fed to the process is from about 20% to about 30% by weight, and the amount of carbonate is from about 5 times to about 15 times the amount theoretically needed to neutralize the anionic surfactant acid.

9. The process of claim 1, 4, 6 or 8 wherein the water content of the granules produced by the process is less than about 3% by weight.

10. The process of claim 8 wherein the speed of the high-speed mixer is from about 400 rpm to about 600 rpm, and the speed of the moderate-speed mixer is from about 50 rpm to about 80 rpm.

11. The process of claim 8 wherein the phosphate builder is sodium tripolyphosphate, and the carbonate fed to the process is sodium carbonate.

12. The process of claim 8 wherein the phosphate builder is tetrasodium pyrophosphate, and the carbonate fed to the process is sodium carbonate.

13. The process of claim 12 wherein the acid fed to the process is alkyl sulfuric acid having an average chain length of from about 14 to about 16 carbon atoms.

14. The process of claim 12 wherein the acid fed to the process is alkylbenzene sulfonic acid having an average chain length of from about 11 to about 14 carbon atoms.

15. The process of claim 12 wherein the acid fed to the process is linear alkylbenezene sulfonic acid having an average chain length of from about 11 to about 14 carbon atoms.

16. The process of claim 12 wherein the acid fed to the process is a mixture of alkyl sulfuric acid and alkylbenzene sulfonic acid having a ratio of from about 20:80 to about 60:40.

* * * * *